(12) United States Patent
Yang

(10) Patent No.: US 9,645,662 B2
(45) Date of Patent: May 9, 2017

(54) PIXEL CIRCUIT, DISPLAY PANEL AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 37 days.

(21) Appl. No.: 14/652,270

(22) PCT Filed: Sep. 22, 2014

(86) PCT No.: PCT/CN2014/087051
§ 371 (c)(1),
(2) Date: Jun. 15, 2015

(87) PCT Pub. No.: WO2015/196597
PCT Pub. Date: Dec. 30, 2015

(65) Prior Publication Data
US 2016/0266689 A1    Sep. 15, 2016

(30) Foreign Application Priority Data

Jun. 27, 2014  (CN) .......................... 2014 1 0302898

(51) Int. Cl.
*G06F 3/041*     (2006.01)
*G09G 3/3225*    (2016.01)
*G09G 3/3233*    (2016.01)

(52) U.S. Cl.
CPC .......... *G06F 3/0412* (2013.01); *G06F 3/0416* (2013.01); *G09G 3/3225* (2013.01);
(Continued)

(58) Field of Classification Search
CPC ..... G09G 3/3233; G09G 3/3208; G06F 3/042
See application file for complete search history.

(56) References Cited

U.S. PATENT DOCUMENTS 7,978,156 B2    7/2011  Kim
2013/0082910 A1*  4/2013  Lee ...................... G09G 3/3208
                                                345/76
(Continued)

FOREIGN PATENT DOCUMENTS

CN      103021331 A    4/2013
CN      103208255 A    7/2013
(Continued)

OTHER PUBLICATIONS

Chinese Office Action of Chinese Application No. 201410302898.8, mailed Sep. 30, 2015 with English translation.
(Continued)

*Primary Examiner* — Gerald Johnson
(74) *Attorney, Agent, or Firm* — Collard & Roe, P.C.

(57) ABSTRACT

Provided is a pixel circuit, a display panel and a display apparatus. The pixel circuit comprises a pixel compensation module, a light emitting module and a touch detection module; the pixel compensation module comprises first to fifth switch units, a pixel driving unit and an energy storage unit; and the touch detection module comprises a detection sub-module and an output sub-module. In the pixel circuit provided by the present disclosure, a pixel compensation module and a touch detection module are integrated, and the pixel compensation module and the touch detection module share a data voltage and scan signal lines. As such, it is possible to reduce the number of signal lines, such that the pitch of pixels is dramatically reduced and IC cost is decreased, achieving higher pixel density. At the same time, in the pixel circuit provided by the present disclosure, the operating current flowing through the electroluminescent (Continued)

unit is not influenced by the threshold voltage of the corresponding driving transistor, and it is possible to avoid nonuniformity in brightness of display caused by threshold voltage drift of driving transistors.

20 Claims, 10 Drawing Sheets

(52) U.S. Cl.
CPC ... *G09G 3/3233* (2013.01); *G09G 2300/0814* (2013.01); *G09G 2300/0819* (2013.01); *G09G 2300/0842* (2013.01); *G09G 2300/0861* (2013.01); *G09G 2310/0264* (2013.01); *G09G 2310/08* (2013.01); *G09G 2320/043* (2013.01); *G09G 2320/045* (2013.01)

(56) References Cited

U.S. PATENT DOCUMENTS

| | | |
|---|---|---|
| 2013/0147856 A1 | 6/2013 | Chou et al. |
| 2013/0207957 A1 | 8/2013 | Lin et al. |
| 2014/0022150 A1* | 1/2014 | Guo .................... G09G 3/3233 345/76 |
| 2014/0152191 A1 | 6/2014 | Yang et al. |
| 2015/0193045 A1* | 7/2015 | Zhou ................... G09G 3/3233 345/174 |
| 2015/0302801 A1* | 10/2015 | Tan ....................... G06F 3/042 345/173 |

FOREIGN PATENT DOCUMENTS

| | | |
|---|---|---|
| CN | 103236238 A | 8/2013 |
| CN | 203179480 U | 9/2013 |
| CN | 203941676 U | 11/2014 |
| JP | 2006-119180 A | 5/2006 |
| KR | 10-0624137 B1 | 9/2006 |

OTHER PUBLICATIONS

International Search Report with Notice of Transmittal of the International Search Report of PCT/CN2014/087051 in Chinese, mailed Mar. 27, 2015.
Written Opinion of the International Searching Authority of PCT/CN2014/087051 in Chinese with English translation, mailed Mar. 27, 2015.

* cited by examiner

PIXEL CIRCUIT, DISPLAY PANEL AND DISPLAY APPARATUS

CROSS REFERENCE TO RELATED APPLICATIONS

This application is the National Stage of PCT/CN2014/087051 filed on Sep. 22, 2014, which claims priority under 35 U.S.C. §119 of Chinese Application No. 201410302898.8 filed on Jun. 27, 2014, the disclosure of which is incorporated by reference.

TECHNICAL FIELD OF THE DISCLOSURE

The present disclosure relates to a pixel circuit, a display panel and a display apparatus.

BACKGROUND

With the rapid development of display technologies, display apparatuses with touch function are becoming more and more popular due to their advantages such as visualized operation. According to different relative positions of the touch screen panel relative to the display panel, existing display apparatuses with touch function can be generally classified into two categories, the on cell touch screen panel and the in cell touch screen panel. Compared with the on cell touch screen panel, the in cell touch screen panel has smaller thickness and higher light transmittance.

As for existing display apparatuses, the OLED (Organic Light Emitting Diode) as a current type light emitting device is more and more applied to high performance display areas due to its characteristics such as self light emitting, fast response, wide angle of view and ability of being fabricated on a flexible substrate. According to different driving manners, OLED display apparatuses can be classified into two categories, the PMOLED (Passive Matrix Driving OLED) and the AMOLED (Active Matrix Driving OLED). The AMOLED display is expected to become the next generation new flat display in place of the LCD (Liquid Crystal Display) due to its advantages such as low fabrication cost, high response speed, low power consumption, DC driving applicable to portable devices, large operating temperature range. In existing AMOLED display panels, each OLED is driven to emit light by a pixel driving circuit composed of multiple TFT (Thin Film Transistor) switches within one pixel unit on the array substrate to realize display. The pixel driving circuit directly determines the quality of the light emitting display of the OLED. Therefore, the design of the pixel driving circuit is key technological content of the AMOLED.

On the other hand, the in cell TSP (Touch Screen Panel) fabricates a sensor for touch and a driving circuit in each pixel unit on the array substrate by the array process as well. If the sensor and the driving circuit of TSP are superimposed in an AMOLED pixel unit, it is necessary to add a certain number of driving circuit TFTs. Therefore, certain space of the pixel unit needs to be occupied additionally, but the free space in the pixel unit is limited. This dramatically limits the simultaneous fabrication of the in cell touch screen panel circuit and the AMOLED driving circuit.

SUMMARY

At least one embodiment of the present disclosure provides a pixel circuit and a display apparatus to avoid the influence of a threshold drift of a driving circuit on the display effect and improve the integration level of an in cell touch screen panel circuit and a pixel driving circuit.

At least one embodiment of the present disclosure provides a pixel circuit comprising a pixel compensation module, a light emitting module and a touch detection module; wherein the pixel compensation module comprises first to fifth switch units, a pixel driving unit and an energy storage unit;

a first terminal of the first switch unit is connected to a first operating voltage, a second terminal of the first switch unit is connected to an input terminal of the pixel driving unit, and a control terminal of the first switch unit is connected to a first scan signal line;

a first terminal of the second switch unit is connected to a second terminal of the energy storage unit, a second terminal of the second switch unit is grounded, a control terminal of the second switch unit is connected to a third scan signal line;

a first terminal of the third switch unit is connected to a first terminal of the energy storage unit, a second terminal of the third switch unit is connected to a data voltage, a control terminal of the third switch unit is connected to a fourth scan signal line;

a first terminal of the fourth switch unit is connected to an output terminal of the pixel driving unit, a second terminal of the fourth switch unit is connected to the second terminal of the energy storage unit, a control terminal of the fourth switch unit is connected to the fourth scan signal line;

a first terminal of the fifth switch unit is connected to the output terminal of the pixel driving unit, a second terminal of the fifth switch unit is connected to the light emitting module, a control terminal of the fifth switch unit is connected to a second scan signal line;

a control terminal of the pixel driving unit is connected to the second terminal of the energy storage unit; and the touch detection module comprises a detection sub-module and an output sub-module, wherein the detection sub-module is connected to the third scan signal line, a second operating voltage and the data voltage respectively for detecting a touch signal, and the output sub-module is connected to the fourth scan signal line, a touch signal read line and the detection sub-module respectively for outputting a touch detection signal to the touch signal read line according to an input of the fourth scan signal line.

Optionally, the light emitting module comprises an electroluminescent element, and the fifth switch unit is connected between the output terminal of the pixel driving unit and an anode of the electroluminescent element.

Optionally, the energy storage unit is a first capacitor.

Optionally, the output sub-module comprises a sixth switch unit whose first terminal is connected to the touch signal read line, whose second terminal is connected to the detection sub-module, and whose control terminal is connected to the fourth scan signal line.

Optionally, the detection sub-module comprises a seventh unit, a touch signal driving unit, a second capacitor and a touch electrode, a first terminal of the seventh switch unit is connected to the data voltage, a second terminal of the seventh switch unit is connected to a control terminal of the touch signal driving unit, a control terminal of the seventh switch unit is connected to the third scan signal line; an input terminal of the touch signal driving unit is connected to the second operating voltage, an output terminal of the touch signal driving unit is connected to the sixth switch unit; the second capacitor is connected between the input terminal and the control terminal of the touch signal driving unit; the touch electrode is connected to the control terminal of the touch signal driving unit.

Optionally, the control terminal of the sixth switch unit is connected to the second scan signal line instead of the fourth scan signal line.

Optionally, the control terminal of the seventh switch unit is connected to the fourth scan signal line instead of the third scan signal line.

Optionally, the respective switch units and driving units are TFTs.

Optionally, each TFT is of P channel type; the control terminal of the driving unit is a gate of a TFT, the input terminal of the driving unit is a source of the TFT, the output terminal of the driving unit is a drain of the TFT; the control terminal of each switch unit is a gate of a TFT, the first terminal and the second terminal of each switch unit correspond to a source and a drain of the TFT respectively.

The present disclosure also provides a display panel comprising pixel circuits according to any of the above.

Further, the pixel circuits are distributed periodically on the display panel.

The present disclosure also provides a display apparatus comprising a display panel according to any of the above.

According to the pixel circuit and the display apparatus provided by the present disclosure, a pixel compensation module and a touch detection module are integrated in the pixel circuit, and the pixel compensation module and the touch detection module share a data voltage and scan signal lines. As such, it is possible to reduce the number of signal lines, such that the pitch of pixels is dramatically reduced and IC cost is decreased, achieving higher pixel density. At the same time, in the pixel circuit provided by the present disclosure, the operating current flowing through the electroluminescent unit is not influenced by the threshold voltage of the corresponding driving transistor, and it is possible to avoid nonuniformity in brightness of display caused by threshold voltage drift of driving transistors.

BRIEF DESCRIPTION OF THE DRAWINGS

FIG. 3 is a time sequence diagram of key signals in a driving method for a pixel circuit shown in FIG. 2a;

DETAILED DESCRIPTION

In the following, specific implementations of the present disclosure are further described in connection with figures and embodiments. The following embodiments are only for more clearly illustrating the technical solutions of the present disclosure, but not for limiting the protection scope of the present disclosure. In the figures, the same reference symbols represent the same elements.

Figure 1:
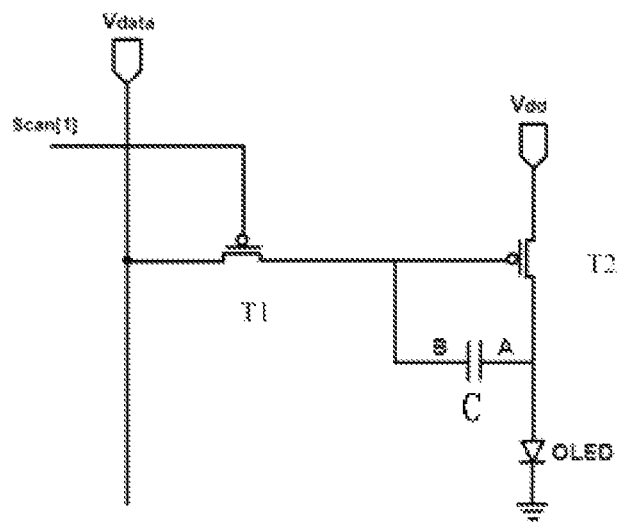
FIG. 1 is a circuit structure diagram of a normal pixel driving circuit.

FIG. 1 is a schematic circuit structure diagram of a normal pixel driving circuit. As shown in FIG. 1, the pixel driving circuit comprises a switch TFT T1, a driving TFT T2 and a storage capacitor C, and T1 and T2 here are both P-channel driving TFTs. A gate of T1 is connected to a scan line Scan[1], a source of T1 is connected to a data voltage line Vdata, and a drain of T1 is connected to terminal B of the capacitor C. Terminal A of C is connected to a drain of T2. Terminal B of C is also connected to a gate of T2, a source of T2 is connected to an operating voltage Vdd, and a drain of T2 is connected to a corresponding OLED. When Scan[1] scans to a row of pixel circuit to be at a low voltage level, T1 is controlled to turn on, and the data voltage Vdd is written to terminal B. When the scan of this row is over, Scan[1] becomes a high voltage level, and T1 is turned off. The data voltage stored in C drives T2 to make it generate current to drive the OLED to ensure that the OLED keeps emitting light within the time of one frame. The saturation current of T2 (i.e., the current following through the OLED) IOLED=K(VGS−Vth)2, where K is a current constant related to T2, VGS is voltage of the gate relative to the source of T2, and Vth is a threshold voltage of T2. It can be seen that IOLED is related to the threshold voltage Vth of T2. In addition, due to fabrication process, device aging and so on, in such a 2T1C pixel driving circuit, the threshold voltage Vth of the driving TFTs at each pixel point would drift, that is, the threshold voltages of the driving TFTs at different pixel points are not uniform, which is easy to make the current flowing through the OLED at each pixel point varies with Vth, such that the display brightness of the display screen is not uniform, influencing the display effect of the whole picture.

Figure 2A:
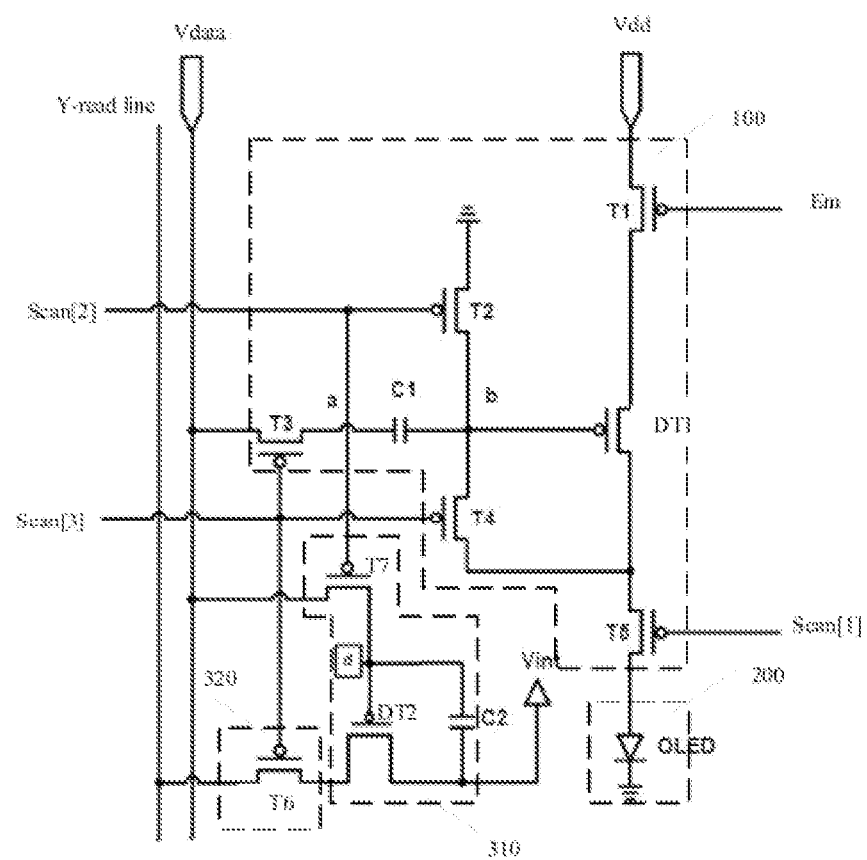
FIGS. 2a-2c are schematic circuit structure diagrams of pixel circuits provided by embodiments of the present disclosure.
Figure 2B:
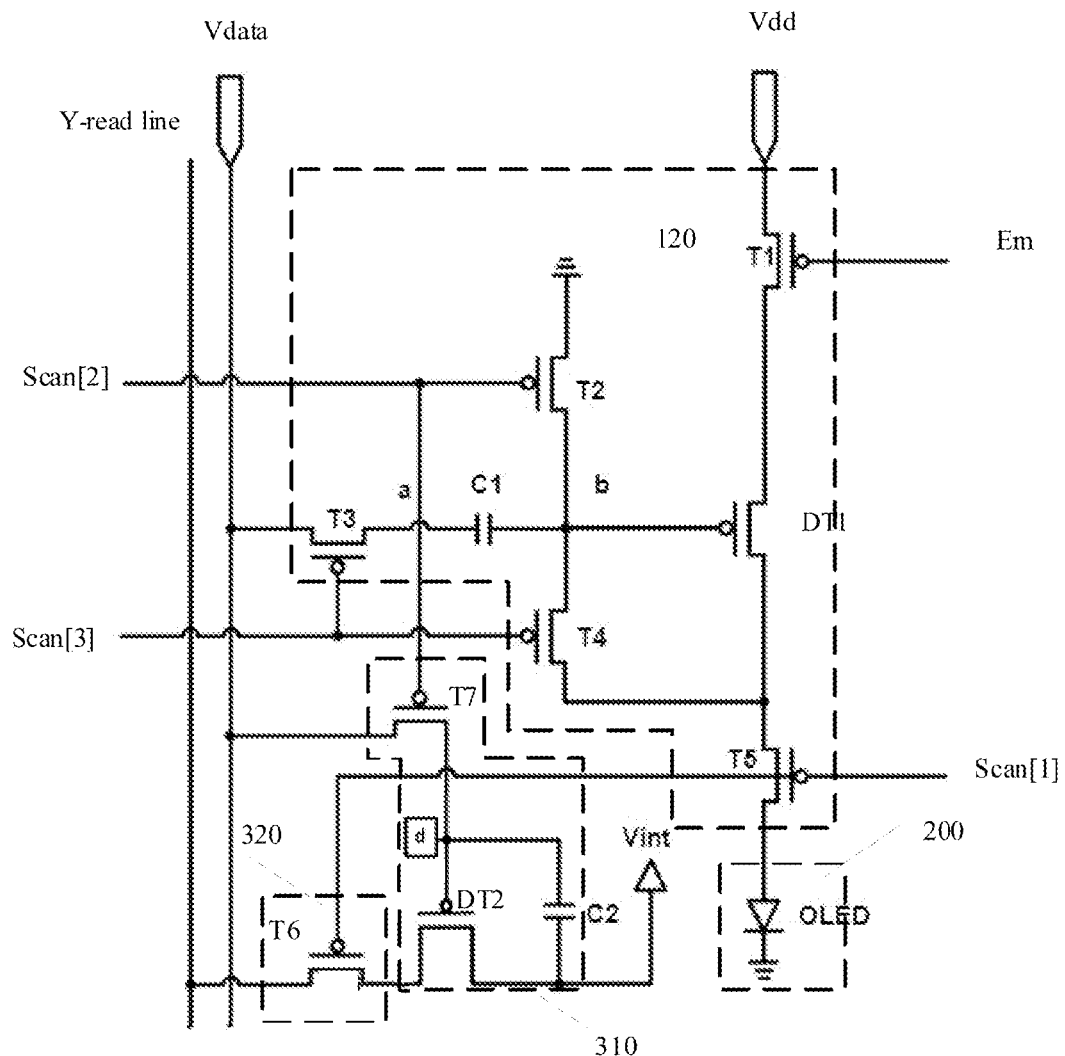
Figure 2C:
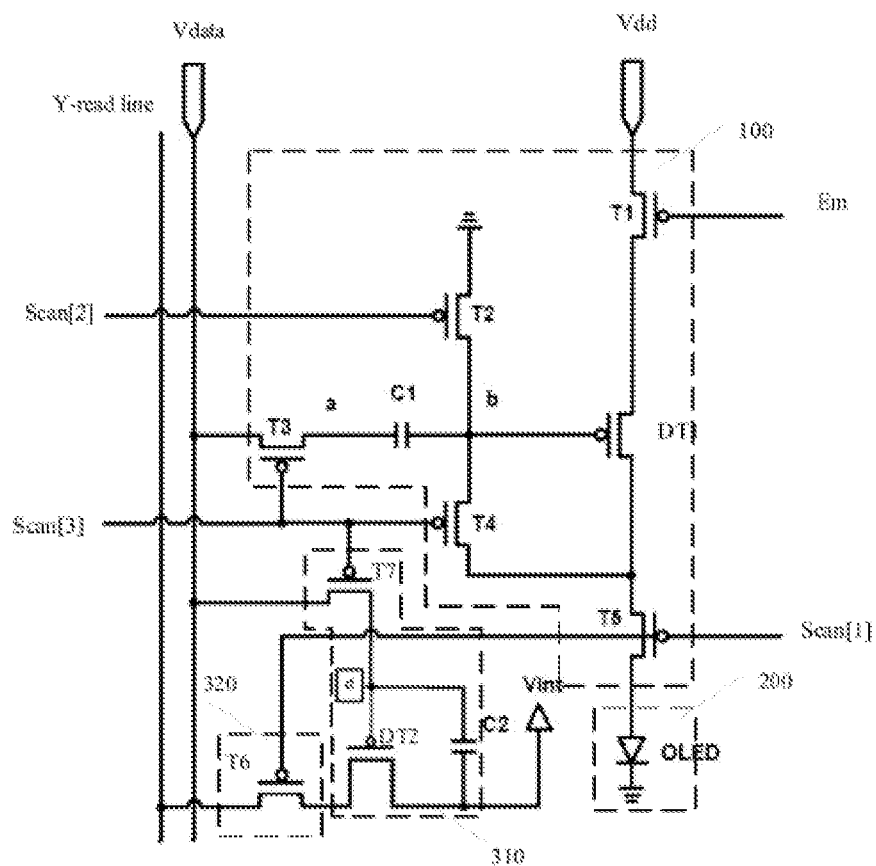

FIGS. 2a-2c are schematic circuit structure diagrams of pixel circuits provided by embodiments of the present disclosure. As shown in FIG. 2a, the pixel circuit comprises: a pixel compensation module 100, a light emitting module 200 and a touch detection module.

The pixel compensation module 100 comprises a first switch unit T1, a second switch unit T2, a third switch unit T3, a fourth switch unit T4, a fifth switch unit T5, a pixel driving unit DT1, and an energy storage unit C1.

A first terminal of the first switch unit T1 is connected to a first operating voltage Vdd, a second terminal of the first switch unit T1 is connected to an input terminal of the pixel driving unit DT1, and a control terminal of the first switch unit T1 is connected to a first scan signal line Em.

A first terminal of the second switch unit T2 is connected to a second terminal b of the energy storage unit C1, a second terminal of the second switch unit T2 is grounded, a control terminal of the second switch unit T2 is connected to a third scan signal line Scan[2].

A first terminal of the third switch unit T3 is connected to a first terminal a of the energy storage unit C1, a second terminal of the third switch unit T3 is connected to a data voltage Vdata, a control terminal of the third switch unit T3 is connected to a fourth scan signal line Scan[3].

A first terminal of the fourth switch unit T4 is connected to an output terminal of the pixel driving unit DT1, a second terminal of the fourth switch unit T4 is connected to the second terminal b of the energy storage unit C1, a control terminal of the fourth switch unit T4 is connected to the fourth scan signal line Scan[3].

A first terminal of the fifth switch unit T5 is connected to the output terminal of the pixel driving unit DT1, a second terminal of the fifth switch unit T5 is connected to the light emitting module 200, a control terminal of the fifth switch unit T5 is connected to a second scan signal line Scan[1].

A control terminal of the pixel driving unit DT1 is connected to the second terminal b of the energy storage unit C1.

The touch detection module comprises a detection sub-module 310 and an output sub-module 320, wherein the detection sub-module 310 is connected to the third scan signal line Scan[2], a second operating voltage Vint and the data voltage Vdata respectively for detecting a touch signal, and the output sub-module 320 is connected to the fourth scan signal line Scan[3], a touch signal read line Y-read Line and the detection sub-module 310 respectively for outputting a touch detection signal to the Y-read Line according to an input of Scan[3].

According to the pixel circuit provided in the present disclosure, a pixel compensation module and a touch detection module are integrated in the pixel circuit, and the pixel compensation module and the touch detection module share a data voltage and scan signal lines. As such, it is possible to reduce the number of signal lines, such that the pitch of pixels is dramatically reduced and IC cost is decreased, achieving higher pixel density. At the same time, the operating current flowing through the electroluminescent unit is not influenced by the threshold voltage of the corresponding driving transistor, solving the nonuniformity in brightness of display caused by threshold voltage drift of driving transistors.

Here, the second operating voltage Vint is used to provide driving pulses.

For example, the light emitting module 200 can comprise an electroluminescent element whose anode is connected to the output terminal of the pixel driving unit DT1 in the pixel compensation module and whose cathode is grounded.

In embodiments of the present disclosure, the electroluminescent element can be various normal current driving light emitting devices including LED (Light Emitting Diode) or OLED (Organic Light Emitting Diode). In embodiments of the present disclosure, OLED is taken as an example for description.

Further, the energy storage unit C1 is a capacitor (referred to as first capacitor). However, in practical applications, the energy storage unit can adopt other elements with energy storage function according to design needs.

Further, as shown in FIG. 2a, the pixel driving unit DT1 is a driving amplification switch.

Further, as shown in FIG. 2a, the output sub-module 320 comprises a sixth switch unit T6 whose first terminal is connected to the touch signal read line Y-read Line, whose second terminal is connected to the detection sub-module 310, and whose control terminal is connected to Scan[3].

Further, the detection sub-module 310 comprises a seventh unit T7, a touch signal driving unit DT2, a second capacitor C2 and a touch electrode d. A first terminal of the seventh switch unit T7 is connected to the data voltage Vdata, a second terminal of the seventh switch unit T7 is connected to a control terminal of the touch signal driving unit DT2, a control terminal of the seventh switch unit T7 is connected to the third scan signal line Scan[2]; an input terminal of the touch signal driving unit DT2 is connected to the second operating voltage Vint, an output terminal of the touch signal driving unit DT2 is connected to one terminal of the sixth switch unit T6; the second capacitor C2 is connected between the input terminal and the control terminal of the touch signal driving unit DT2; the touch electrode d is connected to the control terminal of the touch signal driving unit DT2. At the same time, since the control terminal of DT2 is also connected to one terminal of C2, the touch electrode d is also connected to the capacitor C2 which functions to maintain the voltage of the touch electrode d.

Further, as shown in FIG. 2b, Scan[3] connected to the control terminal of the output sub-module 320 can be replaced by Scan[1], that is, the control terminal of T6 is connected to Scan[1] instead of Scan[3].

Further, on the basis of the circuit shown in FIG. 2b, as shown in FIG. 2c, Scan[2] connected to the control terminal of the detection sub-module 310 can be replaced by Scan[3], that is, the control terminal of T7 is connected to Scan[3] instead of Scan[2].

Further, respective switch units and driving units are TFTs.

Further, as shown in FIG. 2a-2c, each TFT is of P channel type. Now, the input terminal of the driving unit is a source of a TFT, the output terminal of the driving unit is a drain of the TFT and the control terminal of the driving unit is a gate of the TFT. For each switch unit, the control terminal is also a gate of a TFT, and the first terminal and the second terminal correspond to a source and a drain of the TFT respectively.

Using the same type of transistors can realize unification of process procedures so as to improve the yield of the products. It can be understood by those skilled in the art that the types of the transistors can be not completely the same in practical applications. For example, T2 and T7 can be N channel type transistors, and T3 and T4 can be P channel type transistors. As long as two switch units whose control terminals are connected to the same scan signal line can have the same ON/OFF state, the technical solutions provided in the present application can be realized. The implementations described in the present disclosure should not be understood as limiting of the protection scope of the present disclosure.

Figure 3:
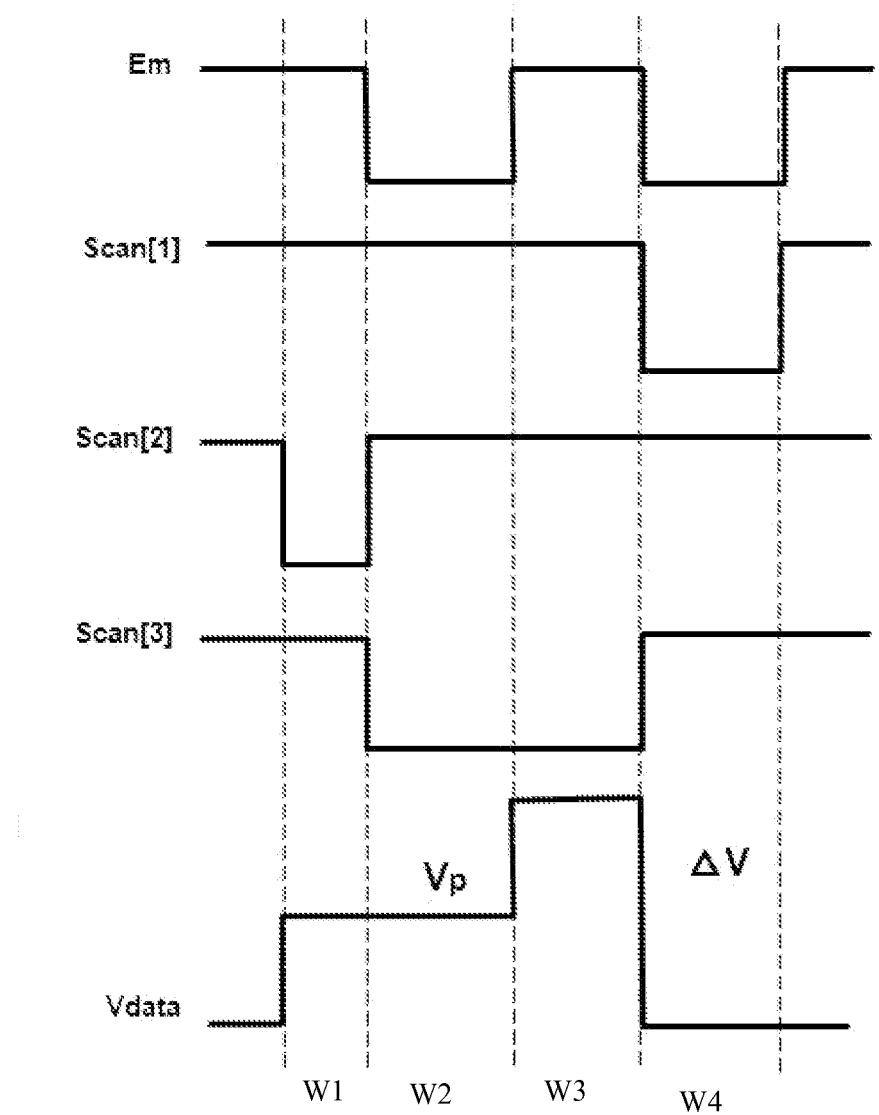

Next, the operating principles of the pixel circuit in FIG. 2a will be described in connection with FIG. 3 and FIG. 4. In order to facilitate the description, it is assumed that respective switch units and driving units are P channel TFTs, and the energy storage unit is a capacitor. FIG. 3 is a possible time sequence diagram of scan signals on respective scan signal lines and the data voltage Vdata within one frame when the pixel circuit shown in FIG. 2a operates, which can be divided into four phases, as shown in FIG. 3, comprising a first phase W1 (the phase in which the pixel compensation module resets and the touch detection module resets), a second phase W2 (the phase in which the pixel compensation module charges and the touch detection module detects), a third phase W3 (the phase in which the pixel compensation module jumps and the touch detection module halts), and a fourth phase W4 (the phase in which the pixel compensation module emits light and the touch detection module halts). FIGS. 4a-4d are schematic diagrams of current directions and voltage values of the pixel circuit shown in FIG. 2a under different time sequences. In the above respective phases W1-W4, the current directions and the voltage values of the pixel circuit are as shown respectively in FIG. 4a, FIG. 4b, FIG. 4c and FIG. 4d.

Figure 4A:
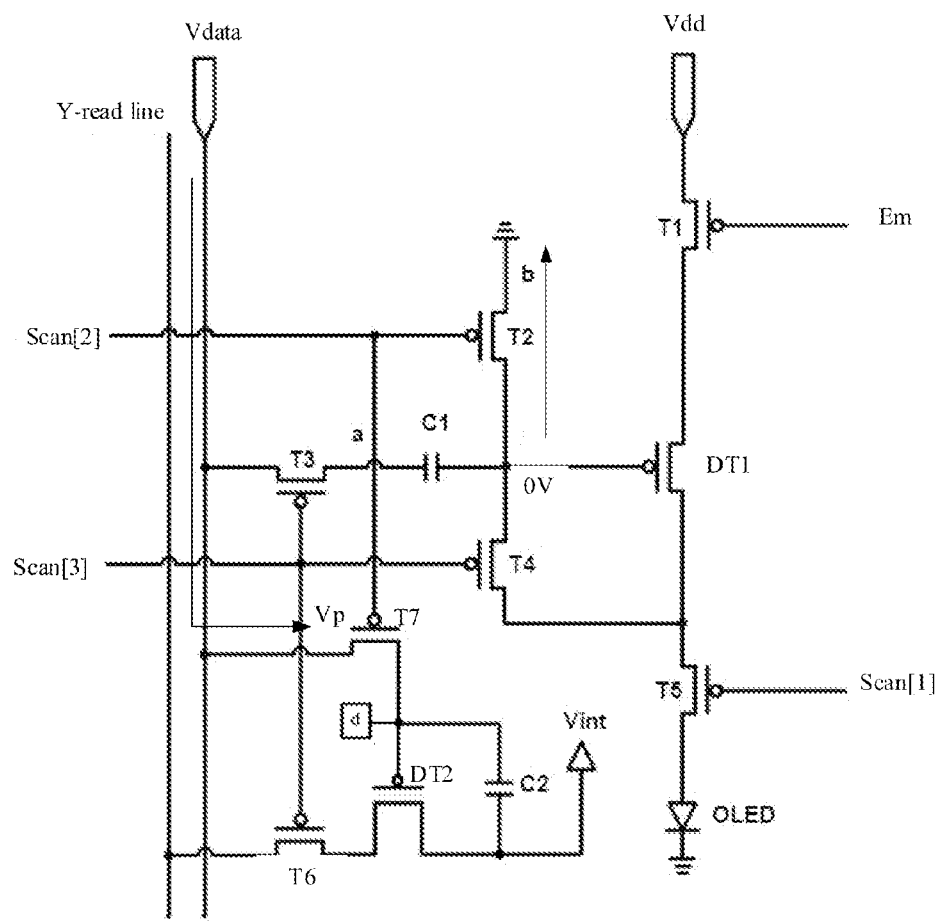
FIGS. 4a-4d are schematic diagrams of current directions and voltage values of a pixel circuit shown in FIG. 2a under different time sequences.

In the first phase W1, referring to FIG. 3, Scan[2] at this time is at a low voltage level, other scan signal lines are at high voltage levels, and the data voltage Vdata is applied with a first voltage Vp. Referring to FIG. 4a, in the pixel compensation module 100, only T2 is turned on, now point b is reset to be grounded, and the potential of the point b is 0 V, which resets the voltage signal of the last frame in the capacitor C1. In the touch detection module, T7 is turned on, and T6 and DT2 are turned off, realizing the reset of the touch detection module. After reset, the potential at d is Vp.

As can be seen, Scan[2] is equivalent to the reset scan signal line Reset line of the pixel compensation module 100 and the touch detection module.

Figure 4B:
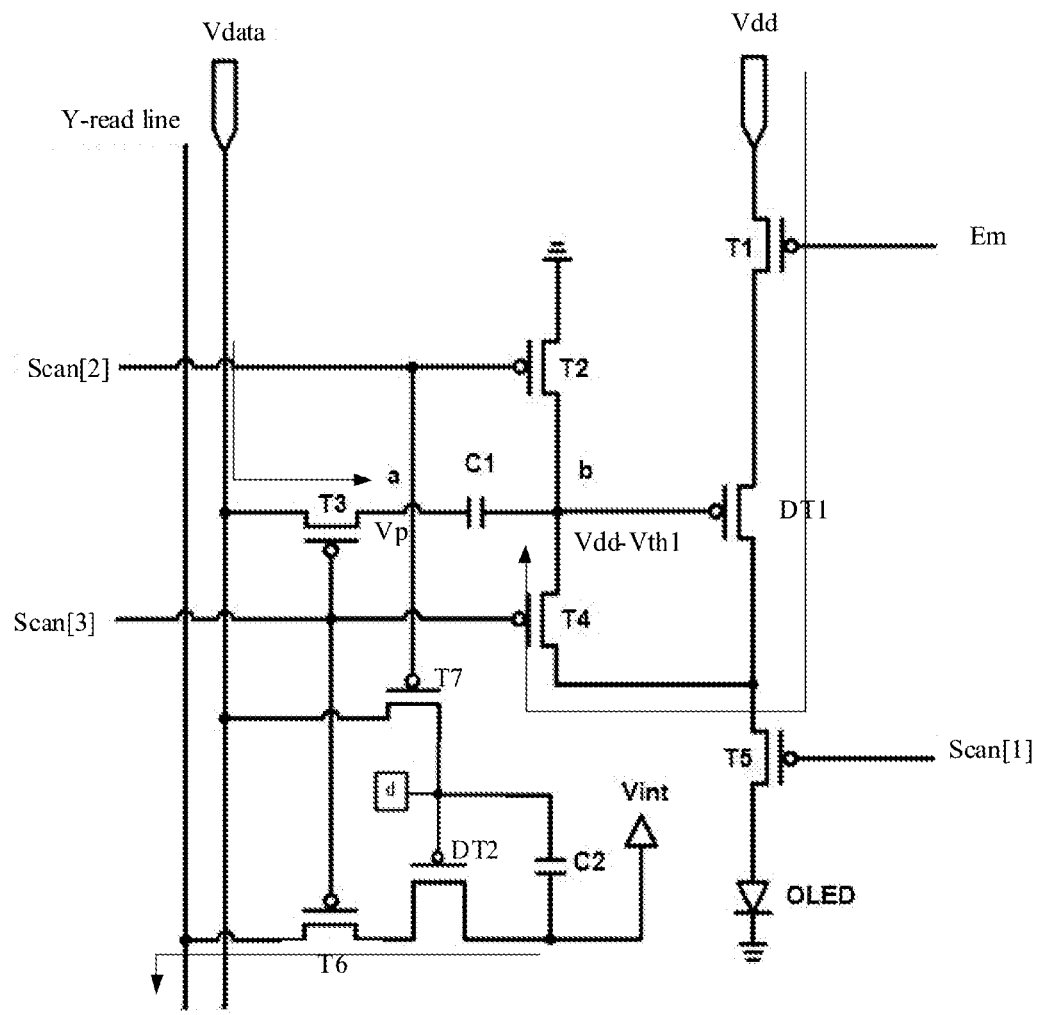

In the second phase W2, referring to FIG. 3, now Em and Scan[1] are at low voltage levels, other scan signal lines are at high voltage levels, and the voltage Vp of Vdata remains unchanged. Referring to FIG. 4b, in the pixel compensation module, T1, T3 and T4 are turned on, and T2 and T5 are turned off. Since point b is grounded before, the pixel driving unit DT1 is turned on, and Vdd charges point b through T1→DT1→T4 until point b is charged to Vdd−Vth1 (the potential difference between the gate and the source of DT1 is Vth1, and Vth1 is the threshold voltage of DT1). At the same time, since T3 is turned on, Vdata charges point a of C1 through T3, and the voltage level of point a remains Vp after the charging is finished. Since the turning off of T5 makes the current not flow through OLED, the life loss of OLED is indirectly reduced.

Figure 5:
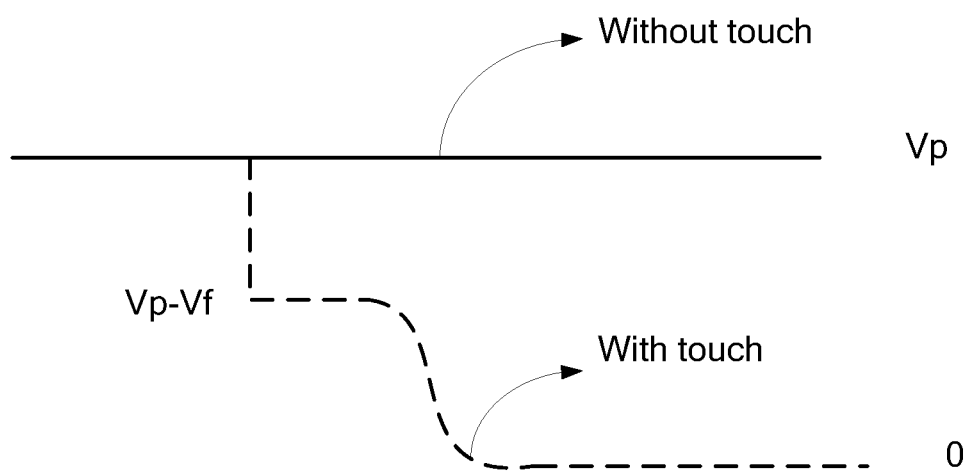
FIG. 5 is a schematic diagram of potential change of the pixel electrode in a pixel circuit provided by the present disclosure.

In the touch detection module, referring to FIG. 4b, T7 is turned off, and T6 is turned on. FIG. 5 is a schematic diagram of potential change of the pixel electrode in the pixel circuit provided in the present disclosure. In the second phase W2, as shown in FIG. 5, when a finger touches, referring to the dashed line part of the figure, the potential Vd of the touch electrode d decreases (for example decreases by Vf), directly causing the gate potential of DT2 to decrease to reach the turning-on condition of DT2. Now, Vint inputs an electrical signal to Y-read line through DT2 and T6. After the finger touch causes Vd to directly decrease by Vf, Vd decreases continuously to 0 due to the discharge of the capacitor C2. However, if there is no finger touch at this time, referring to the solid line part, the potential Vd of the touch electrode d will not decrease, but still remains at Vp. Now, DT2 is turned off, and no electrical signal can be detected in Y-read line.

Now, if a finger touches, the potential of the touch electrode d will be directly caused to decrease, and the turning-on condition of DT2 is reached. At this point, the I&V characteristic curve is in the amplification region, DT2 as an amplification TFT will turn on and amplify the signal of coupling pulses, and Y-Read Line collects the signal in the Y direction. Scan[3] as the scan signal in the X direction (row direction) also has the collection function (since the signal in the Y direction can be collected only when Scan[3] is at a low voltage level, and Scan[3] in pixels of a specific row is a low voltage level signal at a specific time; as such, it is possible to determine which row Scan[3] has scanned according to the time of the collected touch signal to further determine the coordinates of X). In such a way, the X, Y coordinates of the finger touch position are determined. Such a procedure only needs a finger to perform touch, and the coordinate position can be collected any time.

It can be seen that, in an embodiment of the present disclosure, Scan[3] functions as the X direction touch signal read line X-read line.

Figure 4C:
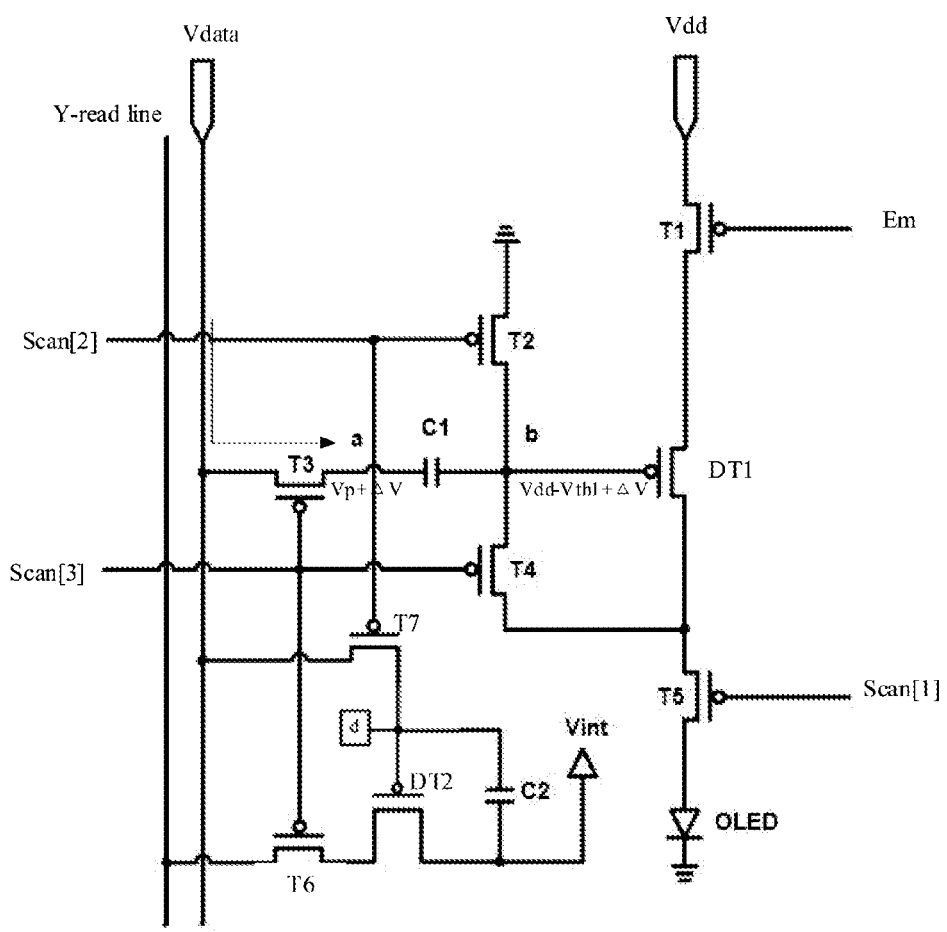

In the third phase W3, as shown in FIG. 3, only Scan[3] is at a low voltage level, other scan signal lines are at high voltage levels, and the voltage applied in Vdata is raised to Vp+ΔV. As shown in FIG. 4c, in the pixel compensation module 100, now T3 and T4 are turned on, and other TFTs are turned off. Now, the potential at point a changes from original Vp to Vp+ΔV, but point b is at a floating state. Therefore, in order to remain the original potential difference (Vdd−Vth1−Vp) between point a and point b, the potential at point b of the gate of DT1 would jump by the same voltage level. The potential at point b jumps to and remains at Vdd−Vth1+ΔV to prepare for the next phase.

In the touch detection module, except T6, other devices do not operate. The touch detection module is in a halt state. In such a way, it is possible to reduce the influence on the display procedure.

Figure 4D:
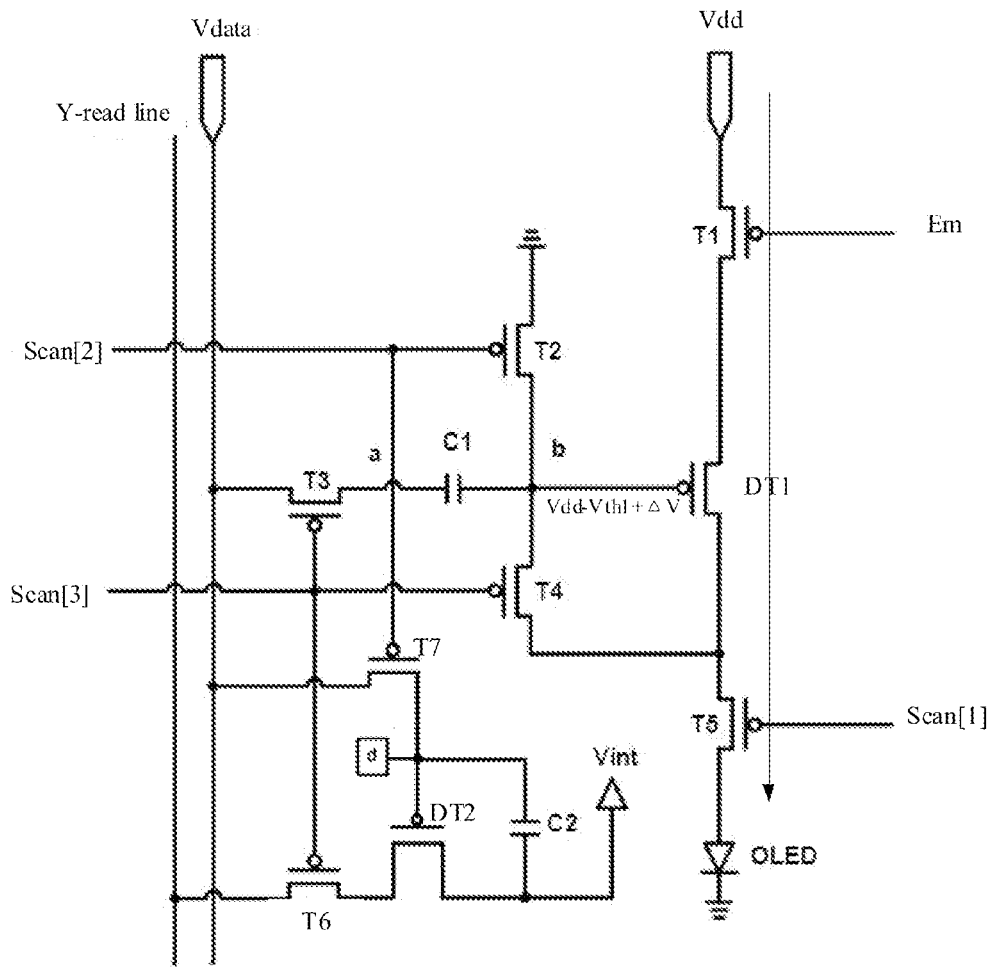

In the fourth phase W4, as shown in FIG. 3, only Scan[1] and Em are at low voltage levels, and other scan signal lines are at high voltage levels. As shown in FIG. 4d, in the pixel compensation module 100, now T1 and T5 are turned on, and T2, T3 and T4 are turned off. Vdd makes OLED start to emit light through T1→DT1→T5.

In the touch detection module, all TFTs are turned off, and the touch detection module is at a halt state, so as to reduce the effect on the display procedure.

Therefore, according to the current characteristic of TFT in the saturation region, it is possible to obtain the current flowing through the pixel driving unit DT1 as:

$$I_{OLED}=K(Vgs-Vth1)^2=K[Vdd-(Vdd-Vth1+\Delta V)-Vth1]^2=K(\Delta V)^2.$$

It can be seen from the above equation that the operating current IOLED is not affected by Vth1 now, but only related to ΔV, which solves the problem of threshold voltage drift of the driving TFTs caused by the fabrication process and long time operation, eliminates its influence on IOLED, and ensures normal operation of OLED.

The operating principle of the pixel circuits provided in FIG. 2b and FIG. 2c is almost the same as that of the pixel circuit in FIG. 2a. The difference is only that, in the pixel circuit as shown in FIG. 2b or FIG. 2c, the touch signal can only be detected when Scan[1] is at a low voltage level (that is, in the fourth phase W4), and now Scan[1] is equivalent to X-read line; in addition, in the pixel circuit as shown in FIG. 2c, the touch detection module can only be reset when Scan[3] is at a low voltage level, and now Scan[3] instead of Scan[2] functions as Reset line.

The present disclosure also provides a display panel comprising any of the above pixel circuits.

Figure 6:
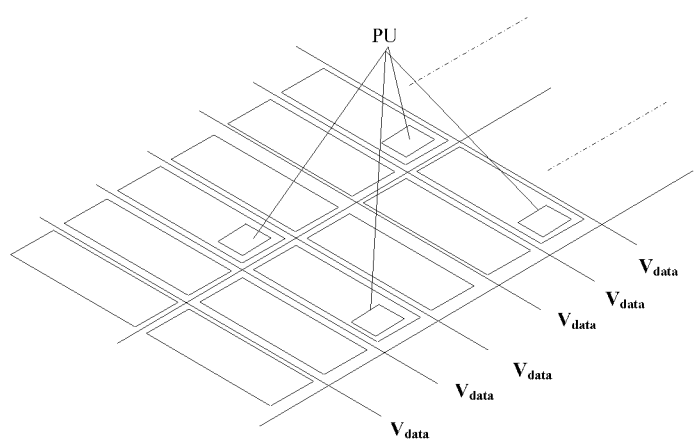
FIG. 6 is a schematic diagram of positional relation between pixel circuits and pixels in a display panel provided by an embodiment of the present disclosure.

Alternatively, the pixel circuits are distributed periodically on the display panel. In practical applications, it is not necessary for all the positions corresponding to respective pixels to each adopt the pixel circuit provided by embodiments of the present disclosure (for example, among three pixels, one is provided with the pixel circuit provided by embodiments of the present disclosure, and the other pixels are provided with normal pixel circuits) to realize the detection of the touch signal. As shown in FIG. 6, one pixel circuit (PU) provided by embodiments of the present disclosure is arranged every three pixels.

The present disclosure also provides a display apparatus comprising the above display panel.

The display apparatus here can be any product or means with display function such as an electronic paper, a cell phone, a tablet, a TV set, a display, a notebook computer, a digital photo frame, a navigator and so on.

The above descriptions are only alternative implementations of the present disclosure. It should be noted that those skilled in the art can make various variations and improvements without departing from the technical principle of the present disclosure. These variations and improvements are also intended to be incorporated within the protection scope of the present disclosure.

The present application claims the priority of Chinese Patent Application No. 201410302898.8 filed on Jun. 27, 2014, entire content of which is incorporated as part of the present invention by reference.

What is claimed is:

1. A pixel circuit comprising a pixel compensation module, a light emitting module and a touch detection module; wherein
the pixel compensation module comprises first to fifth switch units, a pixel driving unit and an energy storage unit;
a first terminal of the first switch unit is connected to a first operating voltage, a second terminal of the first switch unit is connected to an input terminal of the pixel driving unit, and a control terminal of the first switch unit is connected to a first scan signal line;
a first terminal of the second switch unit is connected to a second terminal of the energy storage unit, a second terminal of the second switch unit is grounded, a control terminal of the second switch unit is connected to a third scan signal line;
a first terminal of the third switch unit is connected to a first terminal of the energy storage unit, a second terminal of the third switch unit is connected to a data voltage, a control terminal of the third switch unit is connected to a fourth scan signal line;
a first terminal of the fourth switch unit is connected to an output terminal of the pixel driving unit, a second terminal of the fourth switch unit is connected to the second terminal of the energy storage unit, a control terminal of the fourth switch unit is connected to the fourth scan signal line;
a first terminal of the fifth switch unit is connected to the output terminal of the pixel driving unit, a second terminal of the fifth switch unit is connected to the light emitting module, a control terminal of the fifth switch unit is connected to a second scan signal line;
a control terminal of the pixel driving unit is connected to the second terminal of the energy storage unit; and
the touch detection module comprises a detection sub-module and an output sub-module, wherein the detection sub-module is connected to the third scan signal line, a second operating voltage and the data voltage respectively for detecting a touch signal, and the output sub-module is connected to the fourth scan signal line, a touch signal read line and the detection sub-module respectively for outputting a touch detection signal to the touch signal read line according to an input of the fourth scan signal line.

2. The pixel circuit according to claim 1, wherein the light emitting module comprises an electroluminescent element, and the fifth switch unit is connected between the output terminal of the pixel driving unit and an anode of the electroluminescent element.

3. The pixel circuit according to claim 1, wherein the energy storage unit is a first capacitor.

4. The pixel circuit according to claim 1, wherein the output sub-module comprises a sixth switch unit whose first terminal is connected to the touch signal read line, whose second terminal is connected to the detection sub-module, and whose control terminal is connected to the fourth scan signal line.

5. The pixel circuit according to claim 1, wherein the detection sub-module comprises a seventh unit, a touch signal driving unit, a second capacitor and a touch electrode, a first terminal of the seventh switch unit is connected to the data voltage, a second terminal of the seventh switch unit is connected to a control terminal of the touch signal driving unit, a control terminal of the seventh switch unit is connected to the third scan signal line; an input terminal of the touch signal driving unit is connected to the second operating voltage, an output terminal of the touch signal driving unit is connected to the sixth switch unit; the second capacitor is connected between the input terminal and the control terminal of the touch signal driving unit; the touch electrode is connected to the control terminal of the touch signal driving unit.

6. The pixel circuit according to claim 4, wherein the control terminal of the sixth switch unit is connected to the second scan signal line instead of the fourth scan signal line.

7. The pixel circuit according to claim 6, wherein the control terminal of the seventh switch unit is connected to the fourth scan signal line instead of the third scan signal line.

8. The pixel circuit according to claim 1, wherein the respective switch units and driving units are TFTs.

9. The pixel circuit according to claim 8, wherein each TFT is of P channel type; the control terminal of the driving unit is a gate of a TFT, the input terminal of the driving unit is a source of the TFT, the output terminal of the driving unit is a drain of the TFT; the control terminal of each switch unit is a gate of a TFT, the first terminal and the second terminal of each switch unit correspond to a source and a drain of the TFT respectively.

10. A display panel comprising pixel circuits according to claim 1.

11. The display panel according to claim 10, wherein the pixel circuits are distributed periodically on the display panel.

12. A display apparatus comprising a display panel according to claim 10.

13. The pixel circuit according to claim 2, wherein the energy storage unit is a first capacitor.

14. The pixel circuit claim 2, wherein the output sub-module comprises a sixth switch unit whose first terminal is connected to the touch signal read line, whose second terminal is connected to the detection sub-module, and whose control terminal is connected to the fourth scan signal line.

15. The pixel circuit claim 3, wherein the output sub-module comprises a sixth switch unit whose first terminal is connected to the touch signal read line, whose second terminal is connected to the detection sub-module, and whose control terminal is connected to the fourth scan signal line.

16. The pixel circuit claim 13, wherein the output sub-module comprises a sixth switch unit whose first terminal is connected to the touch signal read line, whose second terminal is connected to the detection sub-module, and whose control terminal is connected to the fourth scan signal line.

17. The pixel circuit according to claim 2, wherein the detection sub-module comprises a seventh unit, a touch signal driving unit, a second capacitor and a touch electrode, a first terminal of the seventh switch unit is connected to the data voltage, a second terminal of the seventh switch unit is connected to a control terminal of the touch signal driving unit, a control terminal of the seventh switch unit is connected to the third scan signal line; an input terminal of the touch signal driving unit is connected to the second operating voltage, an output terminal of the touch signal driving unit is connected to the sixth switch unit; the second capacitor is connected between the input terminal and the control terminal of the touch signal driving unit; the touch electrode is connected to the control terminal of the touch signal driving unit.

18. The pixel circuit according to claim 3, wherein the detection sub-module comprises a seventh unit, a touch signal driving unit, a second capacitor and a touch electrode, a first terminal of the seventh switch unit is connected to the data voltage, a second terminal of the seventh switch unit is connected to a control terminal of the touch signal driving unit, a control terminal of the seventh switch unit is connected to the third scan signal line; an input terminal of the touch signal driving unit is connected to the second operating voltage, an output terminal of the touch signal driving unit is connected to the sixth switch unit; the second capacitor is connected between the input terminal and the control terminal of the touch signal driving unit; the touch electrode is connected to the control terminal of the touch signal driving unit.

19. The pixel circuit according to claim 4, wherein the detection sub-module comprises a seventh unit, a touch signal driving unit, a second capacitor and a touch electrode, a first terminal of the seventh switch unit is connected to the data voltage, a second terminal of the seventh switch unit is connected to a control terminal of the touch signal driving unit, a control terminal of the seventh switch unit is connected to the third scan signal line; an input terminal of the touch signal driving unit is connected to the second operating voltage, an output terminal of the touch signal driving unit is connected to the sixth switch unit; the second capacitor is connected between the input terminal and the control terminal of the touch signal driving unit; the touch electrode is connected to the control terminal of the touch signal driving unit.

20. The pixel circuit according to claim 13, wherein the detection sub-module comprises a seventh unit, a touch signal driving unit, a second capacitor and a touch electrode, a first terminal of the seventh switch unit is connected to the data voltage, a second terminal of the seventh switch unit is connected to a control terminal of the touch signal driving unit, a control terminal of the seventh switch unit is connected to the third scan signal line; an input terminal of the touch signal driving unit is connected to the second operating voltage, an output terminal of the touch signal driving unit is connected to the sixth switch unit; the second capacitor is connected between the input terminal and the control terminal of the touch signal driving unit; the touch electrode is connected to the control terminal of the touch signal driving unit.

* * * * *